US012182273B2

(12) United States Patent
Barber et al.

(10) Patent No.: US 12,182,273 B2
(45) Date of Patent: Dec. 31, 2024

(54) STRING SANITIZER MODELING

(71) Applicant: SAP SE, Walldorf (DE)

(72) Inventors: Thomas Barber, Stutensee (DE);
David Klein, Braunschweig (DE);
Martin Johns, Braunschweig (DE)

(73) Assignee: SAP SE, Walldorf (DE)

( * ) Notice: Subject to any disclaimer, the term of this patent is extended or adjusted under 35 U.S.C. 154(b) by 343 days.

(21) Appl. No.: 17/665,319

(22) Filed: Feb. 4, 2022

(65) Prior Publication Data
US 2023/0252159 A1 Aug. 10, 2023

(51) Int. Cl.
H04L 29/00 (2006.01)
G06F 21/57 (2013.01)
(52) U.S. Cl.
CPC ...... G06F 21/577 (2013.01); G06F 2221/034 (2013.01)
(58) Field of Classification Search
CPC .................. G06F 21/577; G06F 2221/034
USPC .......................................................... 726/25
See application file for complete search history.

(56) References Cited

U.S. PATENT DOCUMENTS

2012/0151592 A1* 6/2012 Veanes ............ G06F 21/51
726/25
2018/0025161 A1* 1/2018 Gauthier ......... G06F 21/577
726/25

OTHER PUBLICATIONS

M. Alkhalaf et al. "Verifying Client-Side Input Validation Functions using String Analysis," in International Conference on Software Engineering, 2012, 11 pages.
M. Alkhalaf et al. "Semantic Differential Repair for Input Validation and Sanitization," in International Symposium on Software Testing and Analysis, 2014, 12 pages.
D. Balzarotti et al. "Saner: Composing Static and Dynamic Analysis to Validate Sanitization in Web Applications." in IEEE Symposium on Security and Privacy, 2008, 15 pages.
Lee et al. "Uniform Resource Identifier (URI): Generic Syntax" Jan. 2005, 56 pages.
F. Yu et al. "Generating Vulnerability Signatures for String Manipulating Programs Using Automata-based Forward and Backward Symbolic Analyses," UC Santa Barbara, 2009-11, Tech. Rep., Jun. 2009, 5 pages.

(Continued)

Primary Examiner — Brandon Hoffman
Assistant Examiner — Michael D Anderson
(74) Attorney, Agent, or Firm — Fountainhead Law Group, PC

(57) ABSTRACT

Code injection is a type of security vulnerability in which an attacker injects client-side scripts modifying the content being delivered. A sanitizer function may provide defense against such attacks by removing certain characters (e.g., characters causing state transitions in HTML). A string sanitizer may be modeled in order to determine its effectiveness by obtaining data flow information indicating string operations that used an input string or information derived therefrom, including a string sanitizer function. A deterministic finite automata representing string values of the output parameter may be generated based on a graph generated from the data flow information, where the automata accepts possible output string values of the sanitizer. It can be determined whether there is a non-empty intersection between the automata for the sanitizer output and an automata representing a security exploit, which would indicate that the sanitizer function is vulnerable to the exploit.

14 Claims, 15 Drawing Sheets

(56) References Cited

OTHER PUBLICATIONS

P. Hooimeijer et al. "Fast and Precise Sanitizer Analysis with BEK." in USENIX Security Symposium, 2011, 6 pages.
S. Lekies et al., "25 Million Flows Later: Large-scale Detection of DOM-based XSS." in ACM CCS, 2013, 12 pages.
W. Melicher et al. "Riding out DOMsday: Towards Detecting and Preventing DOM Cross-Site Scripting." in NDSS, 2018, 22 pages.
B. Stock et al. "From Facepalm to Brain Bender: Exploring Client-Side Cross-Site Scripting." in ACM CCS, 2015, 50 pages.
F. Yu et al. "Symbolic String Verification: An Automata-based Approach," Department of Computer Science, University of California, Santa Barbara, 18 pages.
F. Yu et al. "Patching Vulnerabilities with Sanitization Synthesis." in International Conference on Software Engineering, 2011, 10 pages.

* cited by examiner

600

```
function sanitize(untrusted) {
  return untrusted.replace(/</g, '<').replace(/>/g, '>');
}
```

700

1500

1600

1700

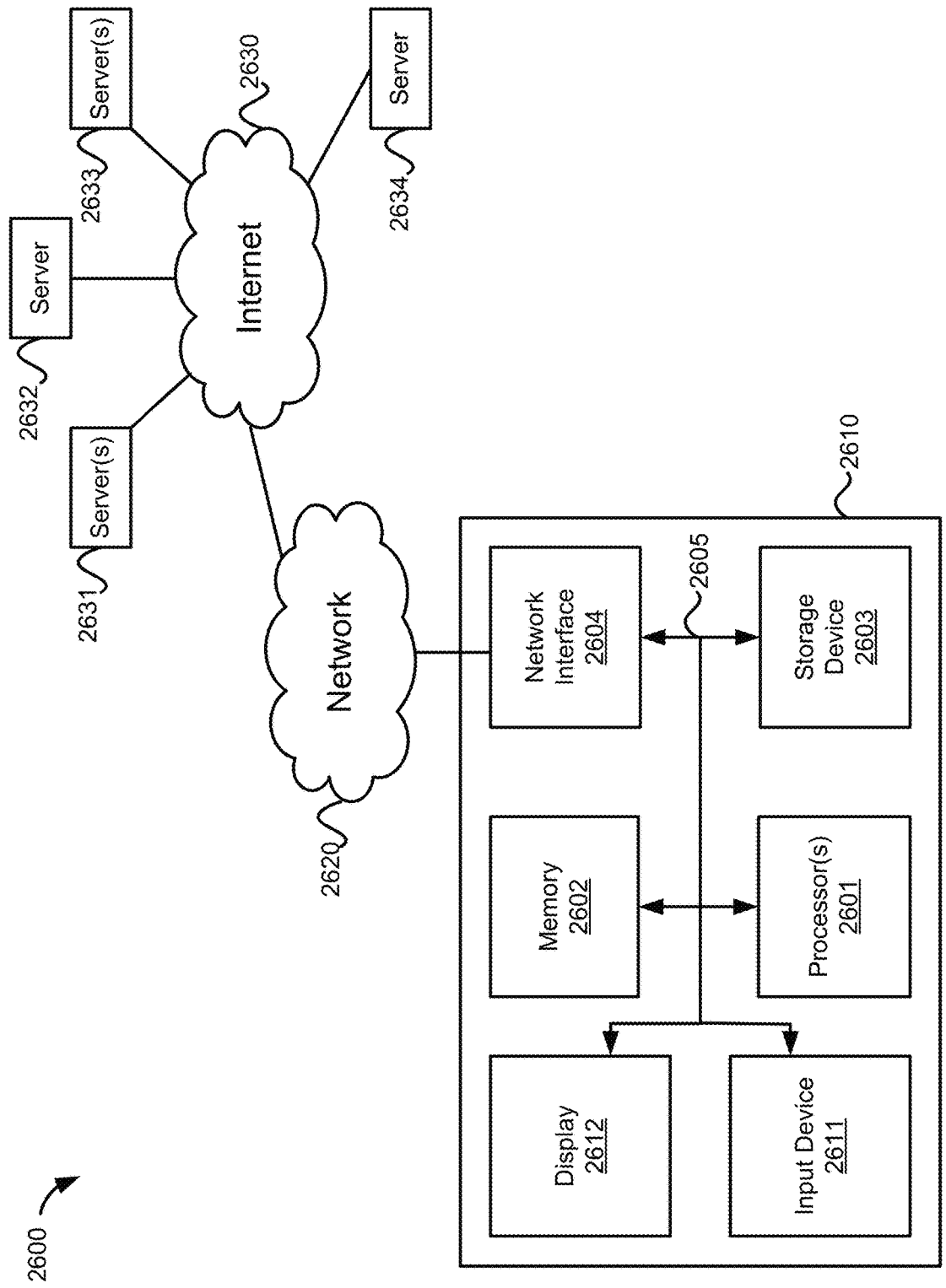

STRING SANITIZER MODELING

BACKGROUND

The present disclosure pertains to computer security and in particular to string sanitization.

Cross-site scripting (XSS) is a code injection type of security vulnerability in which an attack may inject client-side scripts into web pages. The code injection may modify the content being delivered from the compromised website, for example. One defense against XSS attacks is to deploy a sanitizer function which escapes or deletes characters which could cause state transitions in HTML. Many such sanitizer functions are written by hand and some sanitizer functions may not provide sufficient security to protect against possible XSS payloads. There is a need for improved sanitizer functions that are capable of protecting against possible XSS payloads and techniques for verifying the protection.

The present disclosure addresses these issue and others, as further described below.

SUMMARY

One embodiment provides a computer system comprising one or more processors. The computer system further comprises one or more machine-readable medium coupled to the one or more processors and storing computer program code. The computer program code includes sets instructions executable by the one or more processors to obtain data flow information indicating one or more string operations in source code that used an input string or information derived from the input string as a parameter when executing the source code. The one or more string operations include a string sanitizer function. The string sanitizer function includes an input parameter and an output parameter. The computer program code further includes sets instructions executable by the one or more processors to generate a graph representing the input parameter and the output parameter of the string sanitizer function. The computer program code further includes sets instructions executable by the one or more processors to generate, based on the graph, a deterministic finite automata representing string values of the output parameter. The deterministic finite automata accepts possible output string values of the string sanitizer function. The computer program code further includes sets instructions executable by the one or more processors to determine that there is a non-empty intersection between the deterministic finite automata and an exploit automata for a security exploit. The non-empty intersection indicates that the string sanitizer function is vulnerable to a code injection exploit.

Another embodiment provides one or more non-transitory computer-readable medium storing computer program code. The computer program code includes sets of instructions to obtain data flow information indicating one or more string operations in source code that used an input string or information derived from the input string as a parameter when executing the source code. The one or more string operations includes a string sanitizer function. The string sanitizer function includes an input parameter and an output parameter. The computer program code further includes sets of instructions to generate a graph representing the input parameter and the output parameter of the string sanitizer function. The computer program code further includes sets of instructions to generate, based on the graph, a deterministic finite automata representing string values of the output parameter. The deterministic finite automata accepts possible output string values of the string sanitizer function. The computer program code further includes sets of instructions to determine that there is a non-empty intersection between the deterministic finite automata and an exploit automata for a security exploit. The non-empty intersection indicates that the string sanitizer function is vulnerable to a code injection exploit.

Another embodiment provides a computer-implemented method. The method includes obtaining data flow information indicating one or more string operations in source code that used an input string or information derived from the input string as a parameter when executing the source code. The one or more string operations includes a string sanitizer function, the string sanitizer function including an input parameter and an output parameter. The method further includes generating a graph representing the input parameter and the output parameter of the string sanitizer function. The method further includes generating, based on the graph, a deterministic finite automata representing string values of the output parameter. The deterministic finite automata accepts possible output string values of the string sanitizer function. The method further includes determining that there is a non-empty intersection between the deterministic finite automata and an exploit automata for a security exploit. The non-empty intersection indicating that the string sanitizer function is vulnerable to a code injection exploit.

The following detailed description and accompanying drawings provide a better understanding of the nature and advantages of the present disclosure.

BRIEF DESCRIPTION OF THE DRAWINGS

FIG. 26 shows a diagram of hardware of a special purpose computing machine for implementing systems and methods described herein.

DETAILED DESCRIPTION

Figure 1:
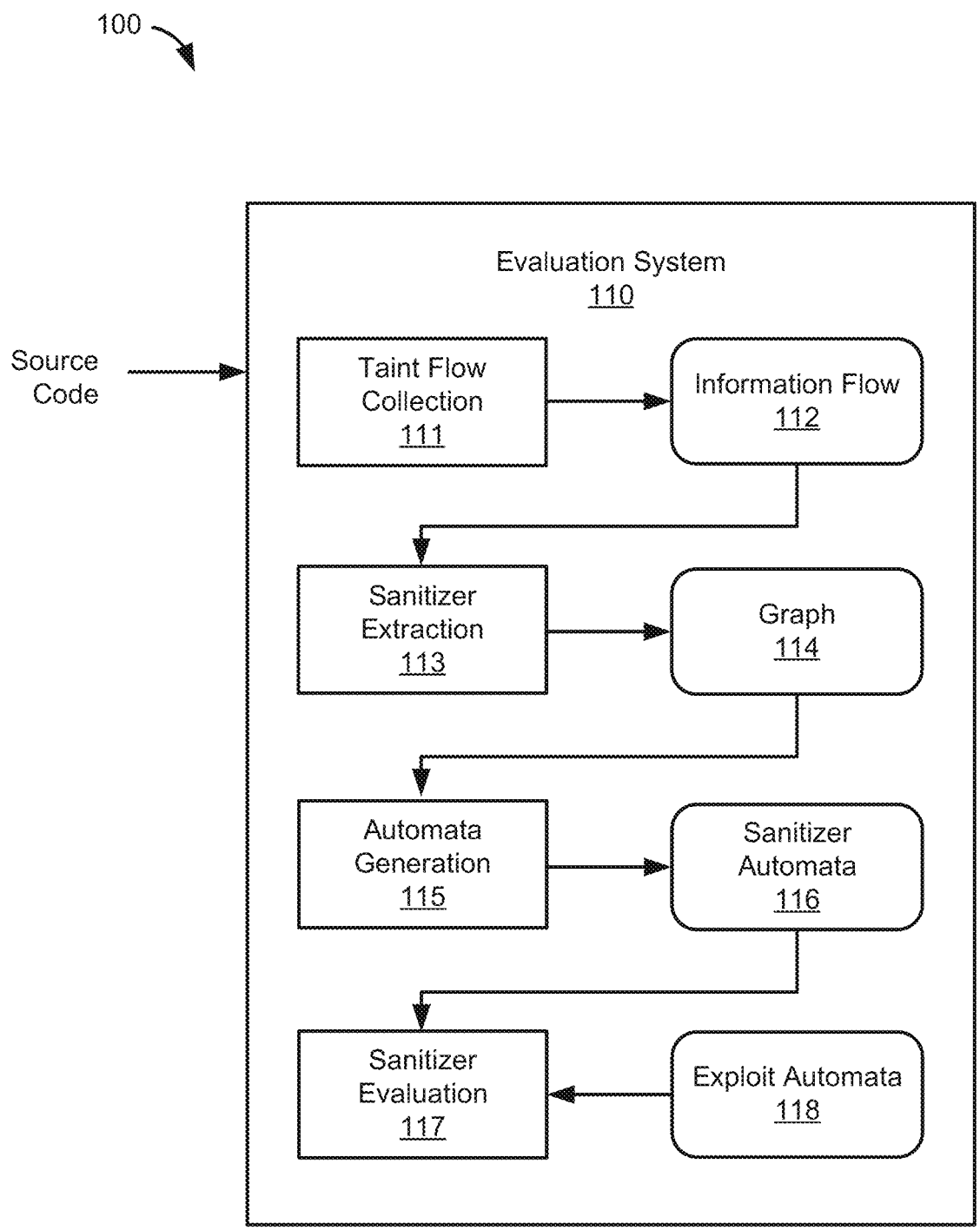
FIG. 1 shows a diagram of an evaluation system, according to an embodiment.

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident, based on the language of the different claims, that the claimed subject matter may include some or all of the features in these examples, alone or in combination, and may further include modifications and equivalents of the features and techniques described herein.

In the figures and their corresponding description, while certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner. In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software. The embodiments can also be practiced in distributed computing environments where operations are performed by remote data processing devices or systems that are linked through one or more wired or wireless networks. As used herein, the terms "first," "second," "third," "fourth," "fifth," "sixth," "seventh," "eighth," "ninth," "tenth," etc., do not necessarily indicate an ordering or sequence unless indicated. These terms, as used herein, may simply be used for differentiation between different objects or elements.

As mentioned above, cross-site scripting (XSS) is a code injection type of security vulnerability in which an attack may inject client-side scripts into web pages. The code injection may modify the content being delivered from the compromised website, for example. One defense against XSS attacks is to deploy a sanitizer function which escapes or deletes characters which could cause state transitions in HTML. Many such sanitizer functions are written by hand and some sanitizer functions may not provide sufficient security to protect against possible XSS payloads. There is a need for improved sanitizer functions that are capable of protecting against possible XSS payloads and techniques for verifying the protection.

Symbolic modelling of string and string operations using deterministic automata (DFAs) is a technique for the modelling and security analysis of sanitizer functions. As many web applications, either server-side or client-side (i.e. executed in the browser) are written in JavaScript, is it important for analysis to support functions available in modern JavaScript.

To resolve these issues, the present disclosure presents techniques to model string operations (such as single replace operations) which are not currently implemented by existing techniques. The techniques disclosed herein provide increased performance of existing replace operations, a method to model single replace operations, modelling of additional operations such as substring, and modelling of built-in browser escape functions such as encodeURI.

These techniques may be implemented by an evaluation system. FIG. 1 shows a diagram 100 of an evaluation system 110, according to an embodiment. The evaluation system 110 may be implemented as a computer system (e.g., computer server) or multiple computer systems in communication with each other. The evaluation system 110 may include one or more processors and memory coupled to the one or more processors. The memory may include system memory and storage memory. The evaluation system 110 may store and execute computer program code to perform the functions of the software modules described below. The one or more computer systems of the evaluation system 110 may include hardware and be configured as described below with respect to FIG. 26, for example.

The evaluation system 110 may source code and evaluate sanitizer functions contained within the source code to determine whether they are vulnerable to a code injection type exploit such as cross-site scripting (XSS). To do this the evaluation system may obtain data flow information 112 (e.g., taint flow information) indicating one or more string operations in source code that used an input string or information derived from the input string as a parameter when executing the source code. The input string may be a string that was input or selected by a user, computer, or device. In general, a "string" refers to a sequence of "characters," where characters are alphanumeric symbols or non-alphanumeric symbols that may be interpreted by a computer (e.g., Unicode characters). A "string" may also refer to a data structure for storing a set of characters. Referring back to the source code that uses an input string, the one or more string operations may include operations performed by a string sanitizer function. In general, a string sanitizer comprises an input parameter, a sequence of string transformation operations and an output parameter. The string transformation operations are applied in sequence to the input, and the resulting string after all operations in the sequence have been performed is the output parameter. The operations themselves can be regular expression replace operations, substring operations, character encoding or any other string transformation. In this example, the string sanitizer function includes an input parameter and an output parameter. The data flow information 112 may be generated by a taint flow collection software module 111. The taint flow collection module 111 may execute the code (e.g., using a web browser) and track which string operations in the source code use a particular input (e.g., a user input) or information derived from that user input.

The evaluation system 110 may then generate a graph 114 representing the input parameter and the output parameter of the string sanitizer function. The graph 114 may be generated by a sanitizer extraction software module 113. The sanitizer extraction software module 113 may extract sanitizer operations from the information flow 112. The sanitizer extraction software module 113 may perform initial filtering, such as filtering taint flows from attacker controllable sources (e.g., URL), discarding direct flows, or discarding operations containing application logic. The sanitizer extraction software module 113 may also perform sanitizer detection, which may include reconstructing a call graph from the taint flow information, flagging operations which perform sanitization, and operating on characters which may cause HTML state transitions. The sanitizer extraction software module 113 may also extract subgraph containing all flagged operations. The sanitizer extraction software module 113 may also perform string operation simplification. The sanitizer extraction software module 113 may also perform replacements with functions.

The evaluation system 110 may then generate, based on the graph, a deterministic finite automata (sanitizer automata 116) representing string values of the output parameter. The deterministic finite sanitizer automata 116 may accept possible output string values of the string sanitizer function. The sanitizer automata 116 may be generated by an automata generation software module 115.

The evaluation system 110 may then determine whether there is a non-empty intersection between the deterministic finite sanitizer automata 116 for the string sanitizer function and an exploit automata 118 for a security exploit. A non-empty intersection indicates that the string sanitizer function is vulnerable to a code injection exploit. If there is a vulnerability, the evaluation system 110 may generate a notification indicating the vulnerability and the particular sanitization function that is vulnerable.

Figure 2:
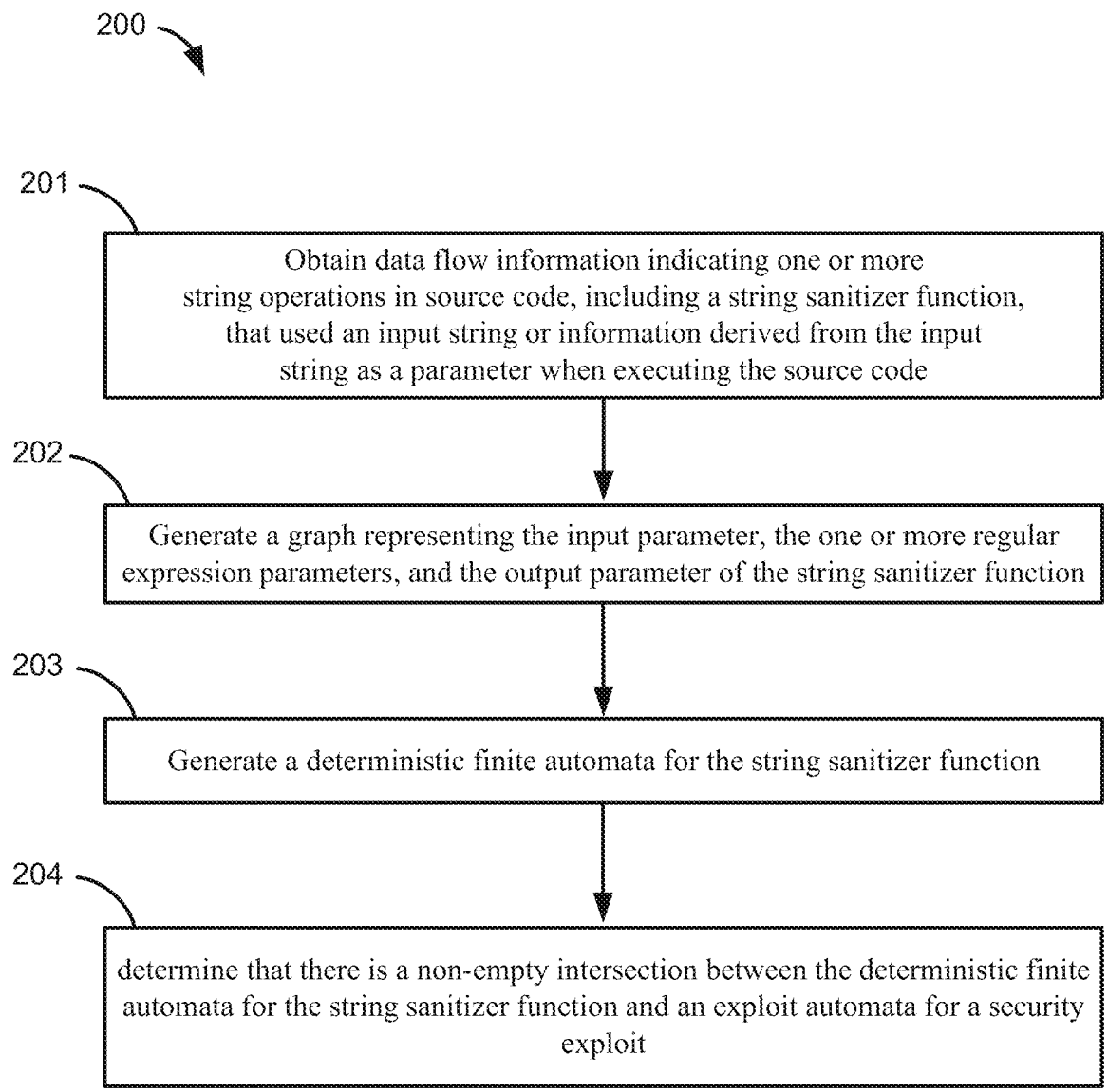
FIG. 2 shows a flow chart of a process for evaluating string sanitizer functions, according to an embodiment.

FIG. 2 shows a flow chart 200 of a process for evaluating string sanitizer functions, according to an embodiment. The process may be performed by an evaluation system such as the one described above with respect to FIG. 1.

At 201, the process obtains data flow information indicating one or more string operations in source code that used an input string or information derived from the input string as a parameter when executing the source code. The one or more string operations includes a string sanitizer function. The string sanitizer function includes an input parameter and an output parameter. The data flow information may be obtained using a taint flow collection technique such the one used by the evaluation system described above with respect to FIG. 1.

At 202, the process generates a graph representing the input parameter and the output parameter of the string sanitizer function. The graph may be generated using a sanitizer extraction technique such the one used by the evaluation system described above with respect to FIG. 1.

At 203, the process generates, based on the graph, a deterministic finite automata representing string values of the output parameter. The deterministic finite automata accepts possible output string values of the string sanitizer function (e.g., a set of all possible output string values of the string sanitizer function or one or more subsets thereof). The deterministic finite automata may be generated using a automata generation technique such the one used by the evaluation system described above with respect to FIG. 1.

At 204, the process determines that there is a non-empty intersection between the deterministic finite automata and an exploit automata for a security exploit. The non-empty intersection indicates that the string sanitizer function is vulnerable to a code injection exploit. The evaluation of the automata may be determined using a sanitizer evaluation technique such as the one used by the evaluation system described above with respect to FIG. 1.

As discussed above, data flow information may be obtained using taint tracking techniques. Taint tracking deals with tracking inputs (e.g., user inputs) to an application. The input data may be used by different functions and the results may be output and then input to other functions or applications. In taint tracking, an input may be labeled as a "source" function and an output may be labeled as a "sink" function. Taint tracking may be implemented by a web browser. Additional taint tracking data (e.g., metadata) may be associated with data objects (e.g., string objects). For instance, when source input is received.

Figure 3:
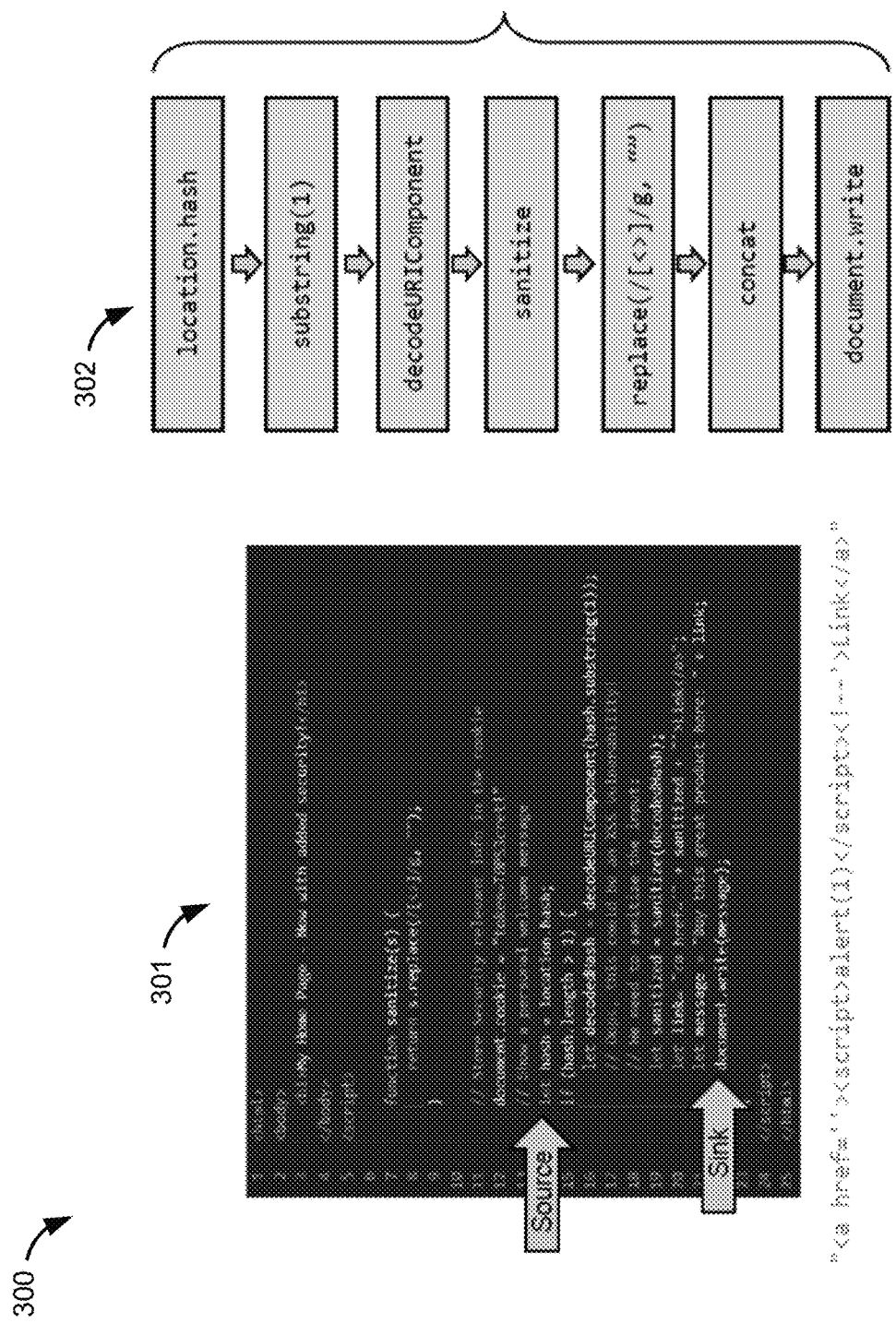
FIG. 3 shows a diagram of source code and data flow information, according to an embodiment.

FIG. 3 shows a diagram 300 of source code 301 and data flow information 302, according to an embodiment. Diagram 300 includes source code 301 including a source function and a sink function. The data flow information 302 shows the flow of the data from the source to the sink. The flow of the source input may be tracked using taint tracking metadata. The data flow information may be used in extracting the sanitizer function (e.g., identifying the sanitizer function), as further described below.

Figure 4:
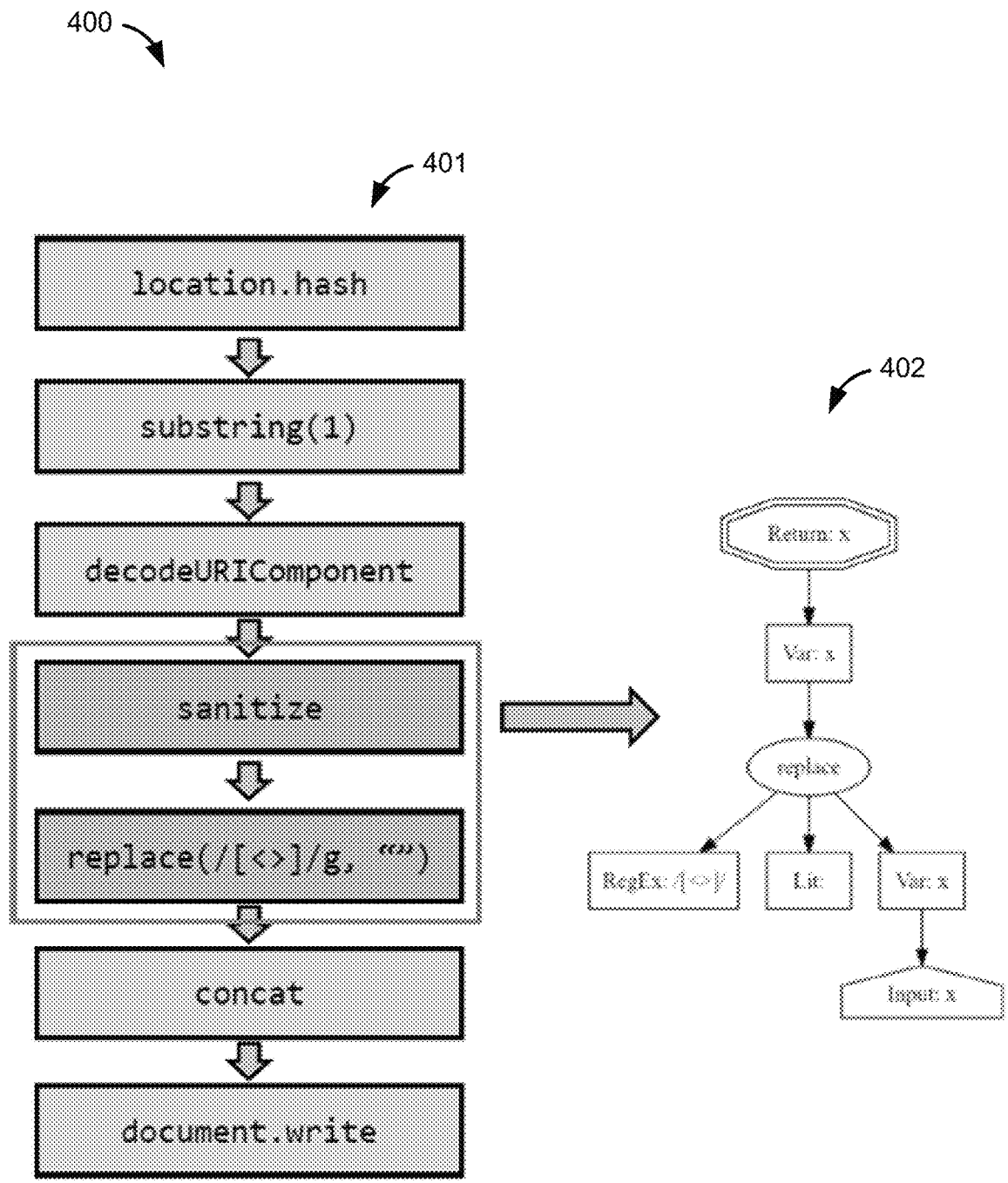
FIG. 4 shows a diagram of data flow information and a graph representing a sanitizer function, according to an embodiment.

As discussed above, sanitizer extraction techniques may be used to determine a graph from data flow information. FIG. 4 shows a diagram 400 of data flow information 201 and a graph 402 representing a sanitizer function, according to an embodiment. As shown in diagram 400, the "sanitize" operation and "replace" operations are identified as being part of the sanitizer function. In order to extract (e.g., identify) the sanitizer, the taint flow information may be filtered first. For instance, certain taint flows may be related to user privacy but not to security. For example, information taken from a cookie may be related to privacy but not security. Such taint flows may be filtered out to reduce the computing resources and time taken to extract sanitizer functions. The process may also include filtering out operations that do not include a sanitizer function.

A graph 402 may be generated based on the extracted sanitizer function. The graph 402 may be a "call graph." It may be referred to as a "dependency graph." The graph 402 includes "Return: x" which depends on "Var. x," which depends on a "replace" operation. The "replace" operation depends on a regular expression (RegEx:/[<>]/), a "Lit" (literal string) and "Var: x." "Var: x" depends on "Input: x." This graph 402 represents the taint flow information and it may be used as an input to generate DFA representing the sanitizer function as described herein.

Figure 5:
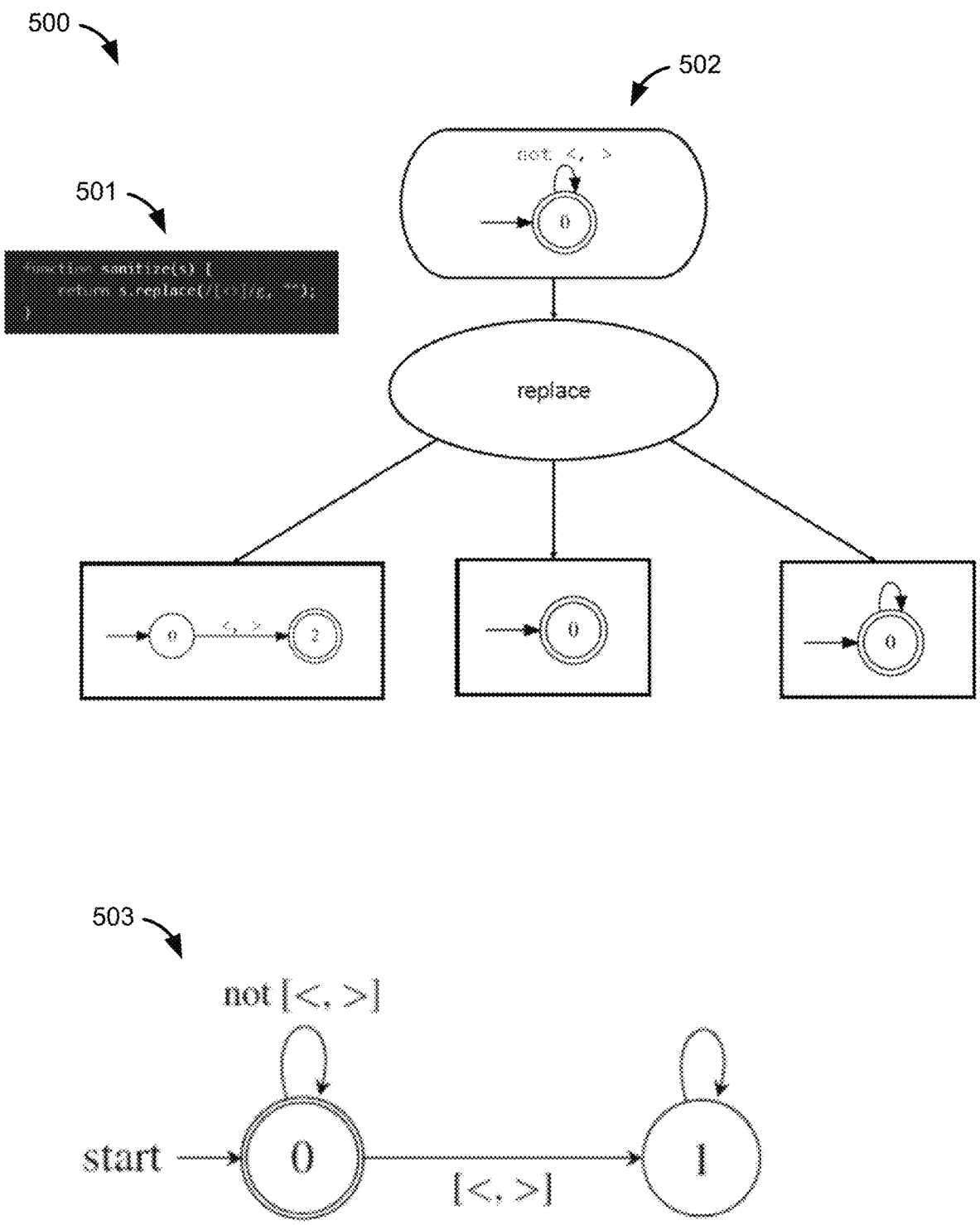
FIG. 5 shows a diagram of a sanitizer function, automata representing parameters of the sanitizer function, and an automata representing accepting possible output string values of the string sanitizer function, according to an embodiment.

As mentioned above, automata generation techniques may be used to generate an automata from a graph based on dataflow information. FIG. 5 shows a diagram 500 of a sanitizer function 501, an automata graph 502 representing parameters of the sanitizer function 501, and an automata 503 representing accepting possible output string values of the string sanitizer function (e.g., all possible output string values of the string sanitizer function), according to an embodiment. The automata graph 502 may be generated based on the dependency graph described above with respect to FIG. 4. The automata graph 502 shows the replace operation having a regular expression (e.g., RegEx:/[<>]/)

represented as an automata, a literal string (e.g., an empty string "") represented as an automata, and an input variable ("x") represented as an automata. The automata 503 may be used to evaluate the sanitizer function by comparing it to an automata representing an exploit as described herein. If the union of the automata representing the sanitizer function and the automata representing an exploit is empty, then the sanitizer is not vulnerable to the exploit.

Sanitizer Automata Generation

As discussed above, deterministic finite automata may be generated to represent sanitizer functions for particular operations. Generation of such automata based on sanitizer functions is further described below.

Figures 6, 7:
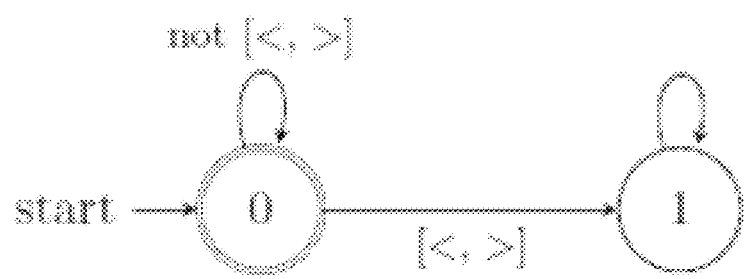
FIG. 6 shows a diagram of an example string sanitizer.
FIG. 7 shows a diagram of an example deterministic finite automaton accepting a regular expression.

Hand-written sanitizer functions are a typical way of defending against potential cross-site-scripting attacks. By removing dangerous characters from untrusted input, user-provided content can be added to a web page's HTML. FIG. 6 shows a diagram 600 of an example string sanitizer. The sanitizer shown in FIG. 6 will replace HTML escape angle brackets so that the untrusted input cannot insert HTML tags. However, hand-written sanitizers may not be sufficient to protect applications in all cases. For example, if the sanitized content in FIG. 6 is inserted into an HTML attribute, an XSS attack is still possible by inserting an Event Handler payload.

Given that hand-written sanitizer functions may not cover every type of security attack, a technique is needed to accurately measure the security properties of sanitizer functions. One technique is by modelling sets of strings as deterministic finite automata (DFA). DFAs are introduced more formally below.

A DFA M is a tuple $\langle Q, q_0, \Sigma, \delta, F \rangle$, recognising the language L over the alphabet $B^k$, where:
 Q is a finite set of states.
 $q_0$ is the initial state.
 $\Sigma \subseteq B^k$ is the alphabet, where each symbol is encoded as a k-bit string.
 F: $Q \rightarrow \{-, +\}$ is a mapping function from a state to its status.
 $\delta$: $Q \times \Sigma \rightarrow Q$ is the transition relation.
Additionally,
 $q \in Q$ is a single state, and is accepting if $F(q)=+$.
 A state q of M is a sink state if $\forall \alpha \in \Sigma$, $\delta(q, \alpha)=q$ and $F(\alpha)=-$.
 Given $\alpha \in B^k$, use $\alpha 0$ or $\alpha 1 \in B^{k+1}$ to denote the bit string that is $\alpha$ appended with 0 of 1.

FIG. 7 shows a diagram 700 of an example deterministic finite automaton accepting a regular expression. In this example, the DFA accepts the regular expression: /^[^<>]*$/. The diagram 700 shows that the DFA starts at state 0, which is an "accept" state as indicated by the two concentric circles. If the input is not "<" or ">" then the state does not change (e.g., it loops back to state 0). If the input is either "<" or ">" then the DFA will transition to state 1, a reject state, which is indicated by state 1 being a single circle, not two concentric circle. This deterministic finite automaton may evaluate the set of possible strings which a sanitizer output can take, which can be used evaluate whether dangerous output is allowed and therefore if a sanitizer is vulnerable. The characters of the string are input to the DFA one at a time and the state of the DFA (e.g., accept state 0 or reject state 1) indicates whether the input was accepted or rejected.

Global Replace

This section describes how a global string replace operation can be modelled using DFAs. The method description is taken verbatim from Yu et al. (2008) and is reproduced here in order to provide necessary background for the following sections. A global string replace operation, that is, an operation which replaces all instances of a string (or pattern) with another string can be defined as:

$$M = \text{replace}(M_1, M_2, M_3)$$

where $M_1$, $M_2$, $M_3$ are the DFAs accepting the set of original strings, the set of matching strings and the set of replacement string respectively. A DFA M is a replaced-DFA of a DFA tuple $(M_1, M_2, M_3)$ if:
$L(M)=\{w|k>0, w_1 x_1 w_2 \ldots w_k x_k w_{k+1} \in L(M_1)$,
$w=w_1 c_1 w_2 \ldots w_k c_k w_{k+1}$,
$\forall 1 \leq i \leq k$,
$x_i \in L(M_2)$,
$c_i \in L(M_3)$,
$\forall 1 \leq i \leq k+1$,
$w_i \notin \{w'_1 x' w'_2 | x' \in L(M_2), w'_1, w'_2 \Sigma^*\}\}$ In this definition, all occurrences of matching sub-strings are replaced. Consider a new alphabet $\bar{\Sigma} = \{\bar{\alpha} | \alpha \in \Sigma\}$, with $\bar{x}$ denoting a new string in which a bar is added to each character in x. Assume that:
 $M_1$, $M_2$, $M_3$ have the same alphabet $\Sigma$,
 $\#_1, \#_2 \notin \Sigma$,
 $\forall \alpha \in \Sigma, \bar{\alpha} \notin \Sigma$ Given the DFA tuple $(M_1, M_2, M_3)$, define:
 $M'_1$, where $L(M'_1) = \{w'|k>0, w=w_1 x_1 w_2 \ldots w_k x_k w_{k+1} \in L(M_1), w'=w_1 \#_1 \bar{x}_1 \#_2 w_2 \ldots w_k \#_1 \bar{x}_k \#_2 w_{k+1}\}$.
 $M'_2$, where $L(M'_2) = \{w'|k>0, w'=w_1 \#_1 \bar{x}_1 \#_2 w_2 \ldots w_k \#_1 \bar{x}_k \#_2 w_{k+1}, \forall \leq i \leq k, x_i \in L(M_2), \forall 1 \leq i \leq k+1, w_i \in L(M_h)\}$, where $L(M_h)$ is the set of strings which do not contain any substring in $L(M_2)$. The language $L(M_h)$ is defined as the complement set of $\{w_1 x W_2 | x \in L(M_2), w_1, w_2 \in \Sigma^*\}$.
 M, where $L(M) = \{w|k>0, w_1 \#_1 \bar{x}_1 \#_2 w_2 \ldots w_k \#_1 \bar{x}_k \#_2 w_{k+1} \in L(M'_1) \cap L(M'_2), w=w_1 c_1 w_2 \ldots w_k c_k w_{k+1}, \forall 1 \leq i \leq k, c_i \in L(M_3)\}$.

The original and bar alphabets can be distinguished by appending an extra bit to $\alpha$ so that $\alpha$ is $\alpha 0$ and $\bar{\alpha}$ is $\alpha 1$. Given that:
 $M_1 = \langle Q_1, q_{10}, \Sigma, \delta_1, F_1 \rangle$
 $M_2 = \langle Q_2, q_{20}, \Sigma, \delta_2, F_2 \rangle$
 $M_3 = \langle Q_3, q_{30}, \Sigma, \delta_3, F_3 \rangle$
the replaced DFA M can be constructed via the following steps:
1) Construct $M'_1$ from $M_1$,
2) Construct $M'_2$ from $M_2$,
3) Generate $M' = M'_1 \cap M'_2$,
4) Construct M" from M' where strings between $\#_1$ and $\#_2$ are replaced by words in $L(M_3)$ and
5) Generate M from M" by projection.

Figure 8:
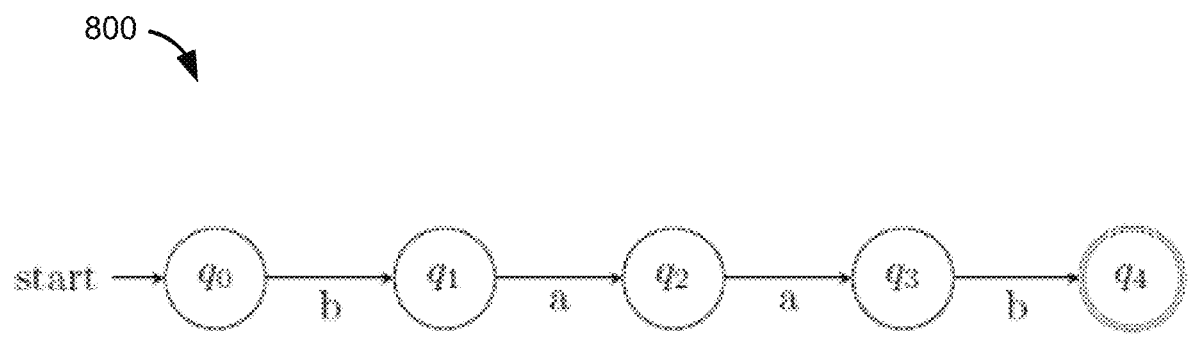
FIG. 8 shows a diagram of an example deterministic finite automaton $M_1$.
Figure 9:
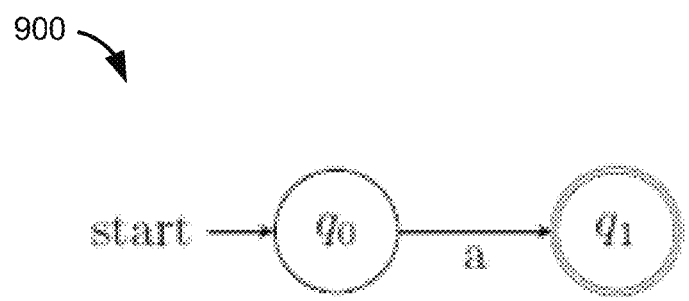
FIG. 9 shows a diagram of an example deterministic finite automaton $M_2$.'

The steps are explained in more detail below, using as an example throughout $M_1$: {baab} as the original string and $M_2$: {a} as the search string. FIG. 8 shows a diagram 800 of an example deterministic finite automaton $M_1$. That is, diagram 800 shows $M_1$: {baab} as the original string. FIG. 9 shows a diagram 900 of an example deterministic finite automaton $M_2$. That is, diagram 900 shows $M_2$: {a} as the search string.

One of the advantages of the techniques described herein is that sanitizer functions using the single replace function (replace once, or replace the first instance) may be evaluated, not just the global replace function (replace all instances). The following examples were chosen to highlight the differences between the global and single replace operations.

Step 1: Construct M'$_1$

M'$_1$=⟨Q'$_1$, q$_{10}$, Σ', δ'$_1$, F'$_1$⟩ is constructed from M$_1$, as follows. Start by creating the states of M'$_1$ by duplicating all the states of M$_1$:

$$Q'_1 = Q_1 \cup Q_{1'},$$

where $Q_{1'}$ is the duplicate of $Q_1$. For all $q \in Q_1$, there is a one to one mapping $q' \in Q_{1'}$. The alphabet of M'$_1$ is the union of the original alphabet, the bar alphabet and the two sharp transitions:

$$\Sigma' = \{\alpha 0 | \alpha \in \Sigma\} \cap \{\alpha 1 | \alpha \in \Sigma\} \cap \{\#_1, \#_2\}$$

Given the transition relation $\delta_1(q_1, \alpha) = q_2$ in M$_1$, the following transitions are present in M'$_1$:

$$\delta'_1(q_1, \alpha 0) = q_2 \text{ and } \delta'_1(q_{1'}, \alpha 1) = q_{2'}.$$

In other words the original state transitions between states within $Q_1$ match those in M$_1$, with a 0 appended to the string. The internal transitions between $Q_{1'}$ states also match those of M$_1$, except with a 1 appended to the string. Additional transitions are allowed from $Q_1$ to $Q_{1'}$ via $\#_1$, and back again from $Q_{1'}$ to $Q_1$ via $\#_2$, as follows:

$$\forall q_1 \in Q_1, \delta'_1(q_1, \#_1) = q_{1'} \text{ and } \delta'_1(q_{1'}, \#_2) = q_1$$

Finally, the accept or reject status F' are maintained for original states $Q_1$, but set to zero for all of $Q_{1'}$:

$$\forall q \in Q_1, F'_1(q) = F_1(q) \text{ and } \forall q \in Q_{1'}, F'_1(q) = 0$$

Figure 10:
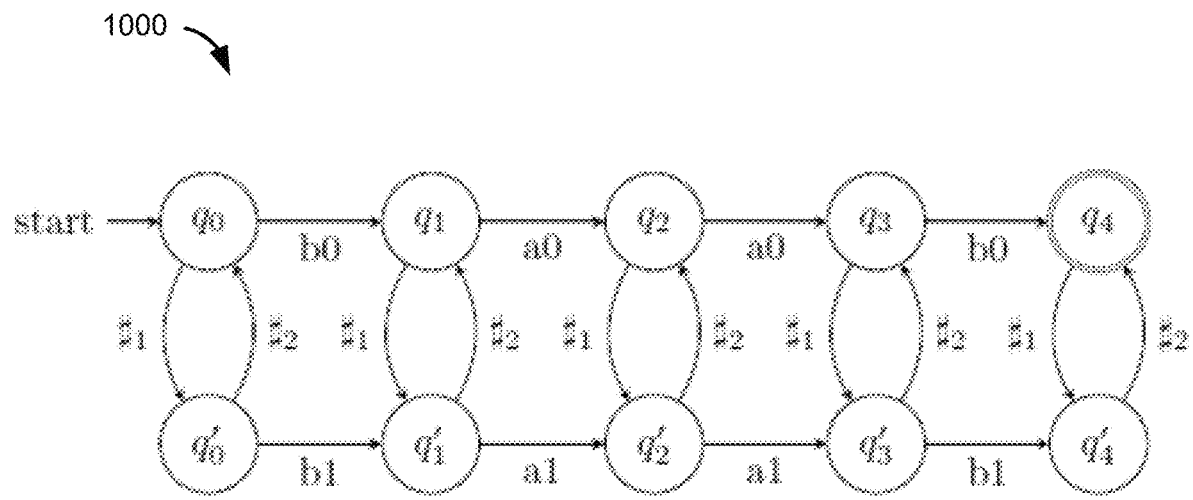
FIG. 10 shows a diagram of an example deterministic finite automaton $M'_1$.

FIG. 10 shows a diagram 1000 of an example deterministic finite automaton M'$_1$. The representation of M'$_1$ constructed from FIG. 8 is shown in FIG. 10.

Construct M'$_2$

To construct M'$_2$ first construct M$_h$ which accepts the complement set of $\{w_1 x w_2 | w_1, w_2 \in \Sigma^*, x \in L(M_2)\}$. Let M$_*$ be the DFA accepting $\Sigma^*$. M$_h$ can be constructed via negate (concat(concat(M$_*$, M$_2$), M$_*$)). Assuming M$_h$=⟨Q$_h$, q$_h$0, Σ, δ$_h$, F$_h$⟩, and M$_2$=⟨Q$_2$, q$_{20}$, Σ, δ$_2$, F$_2$⟩, then M'$_2$=⟨Q'$_2$, q$_{h0}$, Σ', δ'$_2$, F'$_2$⟩ can be constructed by combining the states from M$_2$ and M$_h$:

$$Q'_2 = Q_h \cup Q_2,$$

The alphabet of M'$_2$ is the union of the original alphabet, the bar alphabet and the two sharp transitions:

$$\Sigma' = \{\alpha 0 | \alpha \in \Sigma\} \cup \{\alpha 1 | \alpha \in \Sigma\} \cup \{\#_1, \#_2\}$$

which is the same as the alphabet used by M'$_1$. The transition relations are maintained from M$_h$ and M$_2$ with $\alpha 0$ and $\alpha 1$ transitions respectively:

$$\forall q, q' \in Q_h, \delta'_2(q, \alpha 0) = q', \text{ if } \delta_h(q, \alpha) = q'$$

$$\forall q, q' \in Q_2, \delta'_2(q, \alpha 1) = q', \text{ if } \delta_2(q, \alpha) = q'$$

Transitions between accepting states of M$_h$ to the intial state of M$_2$ are made with $\#_1$, while transitions from accepting states of M$_2$ to the intial state of M$_1$ are made with $\#_2$:

$$\forall q \in Q_h, \delta'_2(q, \#_1) = q_{20} \text{ if } F_h(q) = +$$

$$\forall q \in Q_2, \delta'_2(q, \#_2) = q_{h0} \text{ if } F_2(q) = +$$

Finally, all the accept or reject status of states $Q_h$ are maintained, while all states from $Q_2$ are set to rejecting:

$$\forall q \in Q_h, F'_2(\alpha) = F_h(\alpha) \text{ and } \forall q \in Q_2, F'_2(q) = -$$

Figure 11:
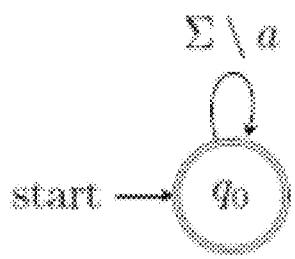
FIG. 11 shows a diagram of an example deterministic finite automaton $M_h$.
Figure 12:
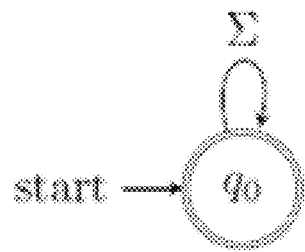
FIG. 12 shows a diagram of an example deterministic finite automaton $M_*$.
Figure 13:
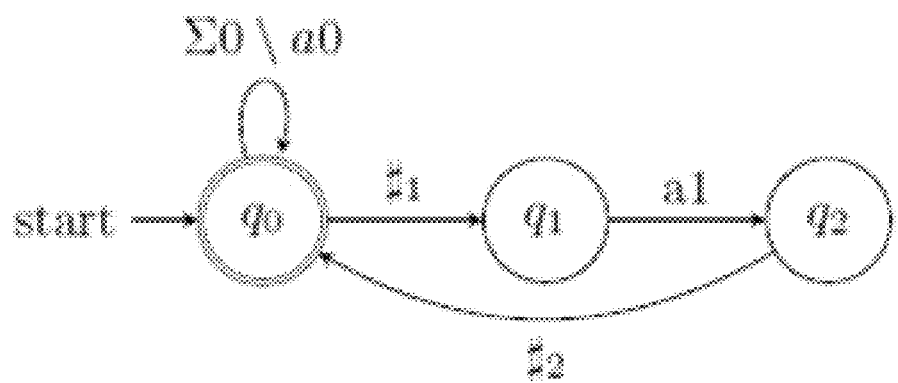
FIG. 13 shows a diagram of an example deterministic finite automaton $M'_2$.

FIG. 11 shows a diagram of an example deterministic finite automaton M$_h$. FIG. 12 shows a diagram of an example deterministic finite automaton M$_*$. FIG. 13 shows a diagram of an example deterministic finite automaton M'$_2$. Examples of M$_h$, M$_*$ and M'$_2$ constructed from M$_2$ from FIG. 9 are shown in FIG. 11, FIG. 12, and FIG. 13 respectively.

Step 3: Generate M'

The automaton M'=⟨Q', q'$_0$, Σ', δ', F'⟩ is generated as the intersection of M'$_1$ and M'$_2$:

$$M' = M'_1 \cap M'_2$$

Figure 14:
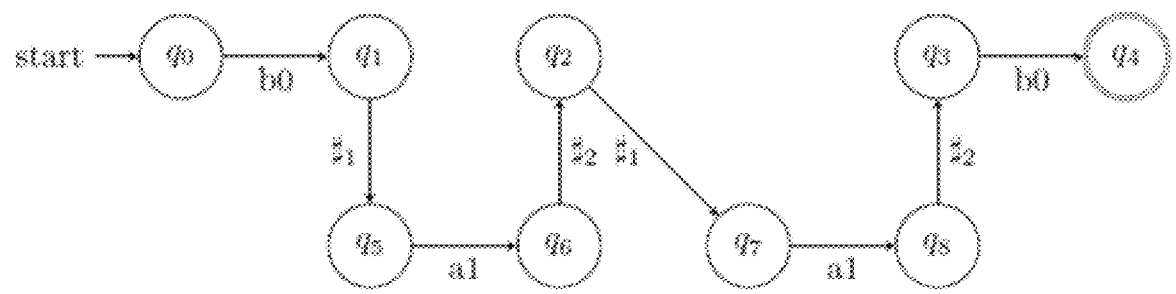
FIG. 14 shows a diagram of an example deterministic finite automaton M'.

FIG. 14 shows a diagram of an example deterministic finite automaton M'. This construction will in effect mark occurrences of the matching strings in the original string, surrounded by transitions $\#_1$ and $\#_2$. The example construction of M' is shown in FIG. 14.

Step 4: Construct M"

In this step, the marked occurrences of matching strings are replaced with the replace automaton M$_3$. To do this, first the reach function is defined:

reach: $Q' \to 2^{Q'}$, which maps a state to all of its $\#$- reachable states in M'. A state q' is $\#$- reachable from q if there exists a sequence q, q$_1$, ..., q$_n$, q' so that:
1) n>1,
2) $\delta'(q, \#_1) = q_1$,
3) $\delta(q_n, \#_2) = q_n$ and
4) $\forall 0 < i < n, \delta'(q_i, x) = q_{i+1}$, where $x \in \{\alpha 1 | \forall \alpha \in \Sigma\}$ In other words, each pair (q, q') where q'∈reach(q) identifies a word in L(M$_2$). The next step is to take each q'∈reach(q), and insert paths between q and q' which accept all words in L(M$_3$). In the case where there exists q', q"∈reach(q) and q'≠q", the insertion will cause nondeterminism.

To address this issue, extra bits may be added to the alphabet which are later projected away. Assuming that n is the maximum size of reach(q) for all q∈Q', then there is needed at most log(n+1) bits to be added to the alphabet. Let P={q|w∈Q', reach(q)>0}, let m=log(n+1), where n is the maximum size of reach(q) for all q∈P and let m$_q$ be an m-bit string. For $\alpha \in B^k$, $\alpha m_q \in B^{k+m}$ is a string in which m$_q$ is appended to $\alpha$. Let m$_0$ be an m-bit string of 0s. Assume ∀q, m$_q$≠m$_0$, and for q∈P, m'$_q$≠m"$_q$ if q', q"∈reach(q).

The construction of M" depends on L(M$_3$), where the following cases are considered:
1) M$_3$ only accepts single characters, i.e. L(M$_3$)⊆Σ
2) M$_3$ only accepts words with more than one character i.e. L(M$_3$)⊆Σ$^+$Σ
3) M$_3$ only accepts the empty string, i.e. L(M$_3$)={ε} (deletion).

The three cases are described in more detail below:

Case 1: Single Character Replacement

For replacement of single characters, that is ∀w∈L(M$_3$), |w|=1, then M"=⟨$\#_1$ Q', q'$_0$, Σ", δ", F" $\#_2$⟩ is constructed as:
The alphabet of M" is a set of characters with k+m bits: $\Sigma'' \subseteq B^{k+m}$
All $\alpha 0$ transitions are inherited from M', i.e.: ∀∈Q', δ"(q, αm$_0$)=q', if δ'(q, α0)=q'
Any reach state transitions are replaced with the single characters in M$_3$, i.e. ∀q∈P, ∀q'∈reach(p), ∀α∈L(M$_3$), δ"(q, αm$_q$)=q'.

Figure 15:
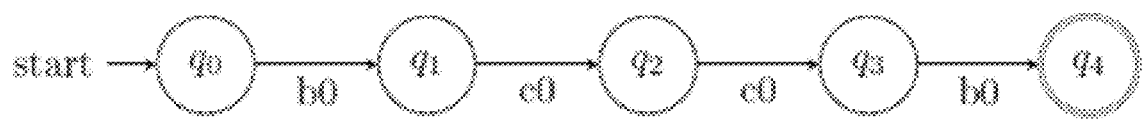
FIG. 15 shows a diagram of an example deterministic finite automaton M" for single character replacement.

FIG. 15 shows a diagram 1500 of an example deterministic finite automaton M" for single character replacement. Using the example with L(M$_3$)={c} is shown in FIG. 15.

Case 2: Multiple Character Replacement

In this case, replace strings are more than one character in length, that is $\forall w \in L(M_3)$, $|w| \geq 2$. For each $p \in P$, construct a copy of $M_3$ as $M_p = \#_1 Q_p$, $q_{p0}$, $\Sigma$, $\delta_p$, $F_p \#_2$ and insert $M_p$ between p and reach(p):

$Q'' = Q' \cup_{p \in P} Q_p$ $\Sigma'' \subseteq B^{k+m}$ $\forall q \in Q'$, $\delta''(q, \alpha m_0) = q'$, if $\delta'(q, \alpha 0) = q'$ $\forall p \in P$, $\forall q \in Q_p$, $\delta''(q, \alpha m_0) = q'$, if $\delta_p(q, \alpha) = q'$.

$\forall p \in P$, $\delta''(p, \alpha m_q) = q$, if $\delta_p(q_{p0}, \alpha) = q$.

$\forall q \in P$, $\forall q \in$ reach(p), $\delta''(q', \alpha m_0) = q$, if $\delta_p(q', \alpha) = q''$ and $F_p(q'') = +$.

$\forall q \in Q'$, $F''(q) = F'(q)$ $\forall p \in P$, $q \in Q_p$, $F''(q) = -$.

In this case, $|M''|$ is bounded by $|M'| + |M'| \times |M'| \times |M_3|$.

Case 3: Deletion

In this case the replacement DFA only accepts the empty string, i.e. $\forall q \in L(M_3)$, $|w| = 0$. In other words, any matching strings are deleted by the replace operation. In this case, $M'' = \#_1 Q'$, $q'_0$, $\Sigma''$, $\delta''$, $F'' \#_2$ can be constructed as follows:

$\Sigma'' \subseteq B^{k+m}$ $\forall q \in Q'$, $\delta''(q, \alpha m_0) = q'$, if $\delta'(q, \alpha 0) = q'$ $\forall p \in P$, $\forall q \in$ reach(p), $\delta''(p, \alpha m_q) = q'$, if $\delta''(q, \alpha 0) = q'$.

$\forall p \in P$, $F''(p) = +$, if $\exists q \in$ reach(p), $F'(q) = +$.

$F''(q) = F'(q)$

Figure 16:
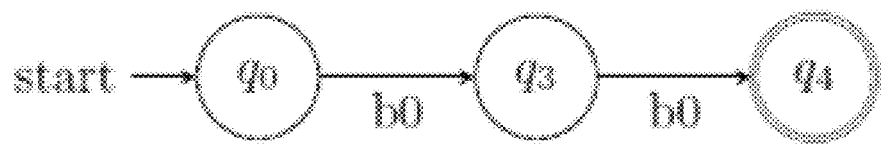
FIG. 16 shows a diagram of an example deterministic finite automaton M" for deletion.

FIG. 16 shows a diagram of an example deterministic finite automaton M'' for deletion. Here, $|M''|$ is bounded by $|M'|$.

General DFA

This technique can be applied to a general DFA $M_3$ to compute: replace($M_1$, $M_2$, $M_3$) = replace($M_1$, $M_2$, $M_{3_1}$) ∪ replace($M_1$, $M_2$, $M_{3_2}$) ∪ replace($M_1$, $M_2$, $M_{3_3}$)

where $L(M_{3_1}) = L(M_3) \cap \Sigma$ $L(M_{3_2}) = L(M_3) \cap \Sigma + \Sigma$ $L(M_{3_3}) \cap \{\varepsilon\}$

Step 5: Projection

Figure 17:
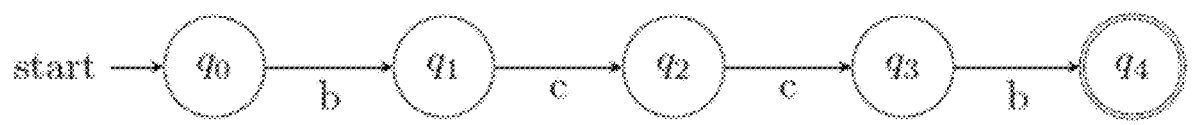
FIG. 17 shows a diagram of an example deterministic finite automaton M.

FIG. 17 shows a diagram 1700 of an example deterministic finite automaton M. The final DFA M=replace($M_1$, $M_2$, $M_3$) over $\Sigma$ can be computed by iteratively projecting away the extra bits. Taking again $L(M_3) = \{c\}$ will yield a final DFA M: bccb as shown in FIG. 17.

Replace Optimization

The algorithm discussed above will replace all occurrences of the set of search strings $M_2$ which are present in the original string set $M_1$. This method, however, fails to model operations in which only the first occurrence of a search string is to be replaced. This operation occurs commonly in modern JavaScript, for example:

var t=str.replace("<", "<");

which will only replace the first instance of the character <. Similarly, a regular expression without the global modifier g:

var t=str.replace(/</, "<");

will only replace the first instance. Therefore, in order to model modern JavaScript replace semantics, an algorithm is required to perform single replace operations on DFAs. In addition, algorithms are required to model string operations such as substring and built-in operations such as encodeURI.

Extensions to the algorithm above are needed to model modern JavaScript operations. In some cases, it is possible to simplify the method for string replacement given above. For example, if the search string is a single character which is replaced by a string, replacement can be performed in a single step as follows. This pattern occurs frequently in sanitizer functions, which tend to replace single characters with an escaped version (e.g. >replaced with >). Single character search strings occur for $M_2$ when $\forall w \in L(M_2)$, $|w| = 1$, with the search character $M_2$: $\{\gamma\}$. In addition, the replacement string is not allowed to be empty, so that $\forall w \in L(M_3)$, $|w| \geq 1$.

In essence, replace transitions of $\gamma$ with a copy of $M_3$, denoted $M_p = \#_1 Q_p$, $q_{p0}$, $\Sigma$, $\delta_p$, $F_p \#_2$. To do this, first construct $M'_1 = \#_1 Q'_1$, $q_{10}$, $\Sigma'$, $\delta'_1$, $F'_1 \#_2$ as follows. The states of $M'_1$ are constructed from a copy of the states from $Q_1$ and n copies of $Q_p$, where n is the number of states in $M_1$ with transition $\gamma$:

$$Q'_1 = Q_1 \cup_{p \in P} Q_p$$

where $P = \{q | q \in Q_1, \delta_1(q, \gamma) = q'\}$. The alphabet of $Q'_1$ is defined as:

$$\Sigma' = \{\alpha 0 | \alpha \in \Sigma\} \cup \{\alpha 1 | \alpha \in \Sigma\}$$

The transition relations are defined as follows. First, transitions between state copied from $Q_1$ excluding $\gamma$ transitions are made with $\alpha 0$:

$$\forall q \in Q_1, \forall \alpha \in \delta_1(q, \alpha) = q', \delta'_1(q, \alpha 0) = q' \text{ if } \alpha \neq \gamma.$$

Transitions between all copies of $M_3 = M_p$ are made using $\alpha 1$:

$$\forall p \in P, \forall q \in Q_p, \delta'_1(q, \alpha 1) = q' \text{ if } \delta_p(q, \alpha) = q'.$$

Any transitions in $M_1$ made with $\gamma$ produce transitions to the initial state of a copy of $M_p$:

$$\forall p \in P, \delta'_1(p, \alpha 1) = q, \text{ if } \delta_p(q_{p0}, \alpha) = q'.$$

Finally, transitions to accepting states in $M_p$ are made back to the original $\gamma$ transition state:

$$\forall p \in P, \delta'_1(q', \alpha 0) = q, \text{ if } \delta_1(p, \gamma) = q, \delta_p(q', \alpha) = q'' \text{ and } F_p(q'') = +.$$

The status of states which are duplicates of $Q_1$ are also duplicated:

$$\forall q \in Q_1, F'(q) = F_1(q),$$

whereas states of $M_p$ are set to reject:

$$\forall p \in P, q \in Q_p, F'_1(q) = -.$$

To obtain the final result, project away the additional bit to obtain M=project($M'_1$, 1).

Replace Once

This section describes a technique for the implementation of a replace operation where only the first instance of a matching string is replaced. As described herein, the replace once operation may be used in JavaScript and so generation of automata modeling of this operation is needed in order to determine whether JavaScript sanitizer functions are secure. Techniques for generating automata to represent the replace once operation are described below.

The model for the single replace operation replace_once is based on the global replace described above, with the algorithm following the same five steps presented above, with modifications described below. In this section, the same running examples are used as above, i.e. $M_1$: {baab} and $M_2$: {a} to illustrate the method.

Step 1: Construct $M'_1$

Figure 18:
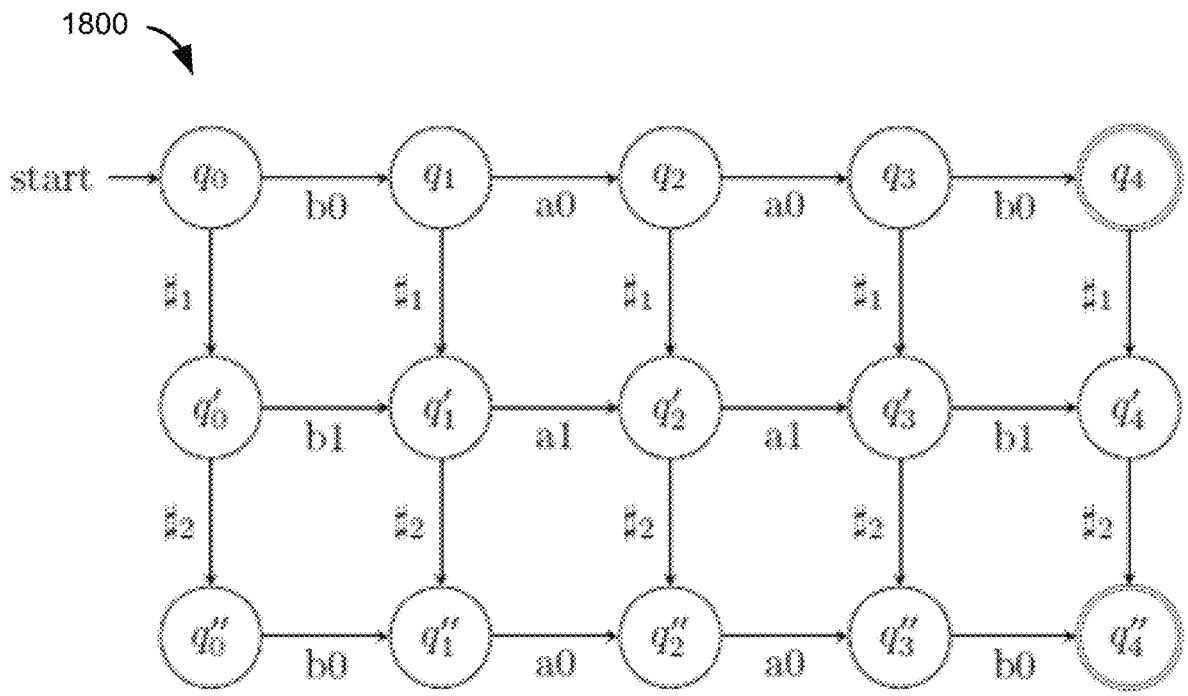
FIG. 18 shows a diagram of a deterministic finite automaton $M'_1$ for single replace, according to an embodiment.

FIG. 18 shows a diagram 1800 of a deterministic finite automaton $M'_1$ for single replace, according to an embodiment. $M'_1 = \#_1 Q'_1, q_{10}, \Sigma', \delta'_1, F'_1 \#_2$ is constructed from $M_1$, as follows. This time the states of $M'_1$ are created by creating two additional duplicates of the states of M:

$$Q'_1 = Q_1 \cup Q_{1'} \cup Q_{1''},$$

where $Q_{1'}$ and $Q_{1''}$ are both duplicates of $Q_1$. For all $q \in Q_1$, there is a one to one mapping $q' \in Q_{1'}$ and $q' \in Q_{1''}$. As with the global replace operation, the alphabet of $M'_1$ is the union of the original alphabet, the bar alphabet and the two sharp transitions:

$$\Sigma' = \{\alpha 0 | \alpha \in \Sigma\} \cup \{\alpha 1 | \alpha \in \Sigma\} \cup \{\#_1, \#_2\}$$

Given the transition relation $\delta_1(q_1, \alpha) = q_2$ in $M_1$, the following transitions are present in $M'_1$:

$$\delta'_1(q_1, \alpha 0) = q_2$$

$$\delta'_1(q_{1'}, \alpha 1) = q_{2'}$$

$$\delta'_1(q_{1''}, \alpha 0) = q_{2''}$$

In other words the transitions internally between states in $Q_1$ and $Q_{1''}$ match those of $M_1$ with a 0 appended to each transition string. The internal transitions between states in $Q_{q'}$ match $M_1$ with a 1 appended to each transition string. Additional transitions are allowed from $Q_1$ to $Q_{1'}$ via $\langle$, and from $Q_{1'}$ to $Q_{1''}$ via $\rangle$, as follows:

$$\forall q_1 \in Q_1, \delta'_1(q_1, \langle) = q_{1'}$$
$$\forall q_{1'} \in Q_{1'}, \delta'_1(q_{1'}, \rangle) = q_{1''}$$

Finally, the accept or reject status F' are maintained for the states $Q_1$ and $Q_{1''}$, but set to zero for all of $Q_{1'}$:

$$\forall q \in Q_1, F'_1(q) = F_1(q)$$

$$\forall q \in Q_{1'}, F'_1(q) = 0$$

$$\forall q \in Q_{1''}, F'_1(q) = F_1(q)$$

The construction of $M'_1$ from $M_1$: {baab} is shown in FIG. 18.

Step 2: Construct $M'_2$

Figure 19:
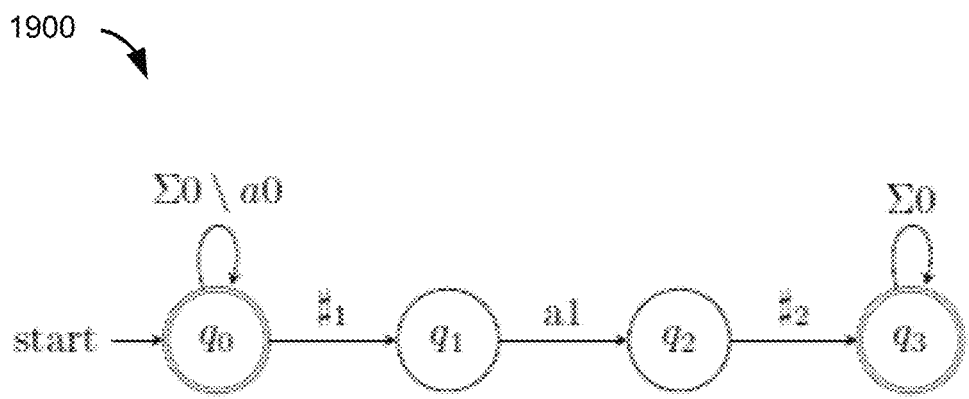
FIG. 19 shows a diagram of a deterministic finite automaton $M'_2$ for single replace, according to an embodiment.

FIG. 19 shows a diagram 1900 of a deterministic finite automaton $M'_2$ for single replace, according to an embodiment. Assuming the definitions of $M_h$ and $M_*$ above, construct $M'_2 = \#_1 Q'_2, q_h 0, \Sigma', \delta'_2, F'_2 \#_2$ as:

$$Q'_2 = Q_h \cup Q_2 \cup Q_*,$$

The alphabet of $M'_2$ is the union of the original alphabet, the bar alphabet and the two sharp transitions:

$$\Sigma' = \{\alpha 0 | \alpha \in \Sigma\} \cup \{\alpha 1 | \alpha \in \Sigma\} \cup \{\#_1, \#_2\}$$

which is the same as the alphabet used by $M'_1$. The internal transition relations are maintained from $M_h$, $M_2$ and $M_*$ with $\alpha 0$, $\alpha 1$ and $\alpha 0$ transitions respectively:

$$\forall q, q' \in Q_h, \delta'_2(\alpha, \alpha 0) = q', \text{ if } \delta_h(q, \alpha) = q'$$

$$\forall q, q' \in Q_2, \delta'_2(\alpha, \alpha 1) = q', \text{ if } \delta_2(q, \alpha) = q'$$

$$\forall q, q' \in Q_*, \delta_*(\alpha, \alpha 0) = q', \text{ if } \delta_*(q, \alpha) = q'$$

Transitions between accepting states of $M_h$ to the initial state of $M_2$ are made with $\langle$, while transitions from accepting states of $M_2$ to the intial state of $M_*$ are made with $\rangle$:

$$\forall q \in Q_h, \delta'_2(q, \#1) = q_{20} \text{ if } F_h(q) = +$$

$$\forall q \in Q_2, \delta'_2(q, \#2) = q_{*0} \text{ if } F_2(q) = +$$

Finally, all the accept or reject status of states $Q_h$ and $Q_*$ are maintained, while all states from $Q_2$ are set to rejecting:

$$\forall q \in Q_h, F'_2(\alpha) = F_h(\alpha)$$

$$\forall q \in Q_2, F'_2(q) = -$$

$$\forall q \in Q_*, F'_2(\alpha) = F_*(\alpha)$$

The construction of $M'_2$ from $M_2$: {a} is shown in FIG. 19.

Step 3: Construct M'

Figure 20:
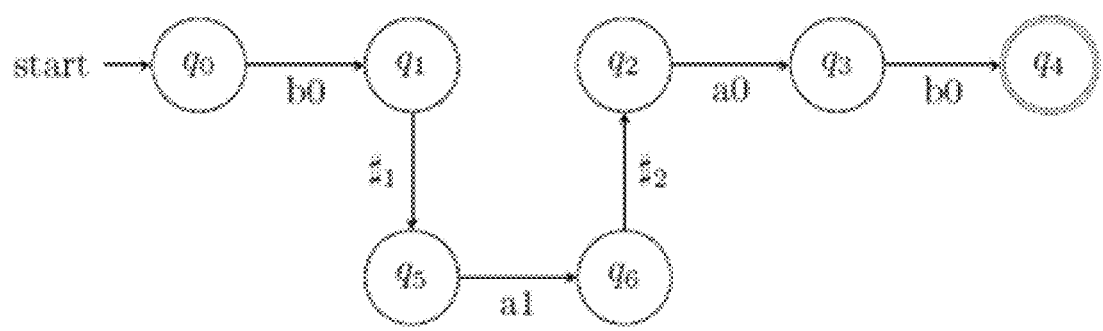
FIG. 20 shows a diagram of a deterministic finite automaton M' for single replace, according to an embodiment.

FIG. 20 shows a diagram 2000 of a deterministic finite automaton M' for single replace, according to an embodiment. M' is constructed in the same way as for global replace operations as the intersection of $M'_1$ and $M'_2$:

$$M' = M'_1 \cap M'_2$$

This construction will in effect mark the first occurrence of the matching strings in the original string, surrounded by transitions $\langle$ and $\rangle$.

The construction of M' using example DFAs is shown in FIG. 20.

Steps 4 and 5

Figure 21:
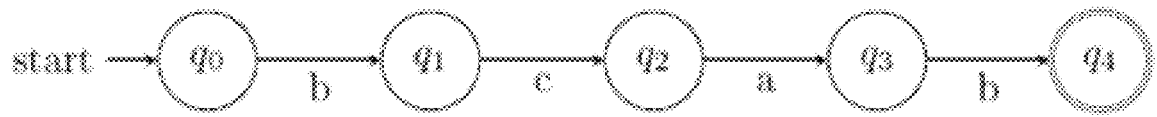
FIG. 21 shows a diagram of a deterministic finite automaton M for single character replace, according to an embodiment.

FIG. 21 shows a diagram 2100 of a deterministic finite automaton M for single character replace, according to an embodiment. Construct M" (step 4) and subsequently compute M in the same way as for global replace, as described above. Taking $L(M_3) = \{c\}$ (i.e. case 1) will produce a final DFA M: {bcab} shown in FIG. 21.

Figure 22:
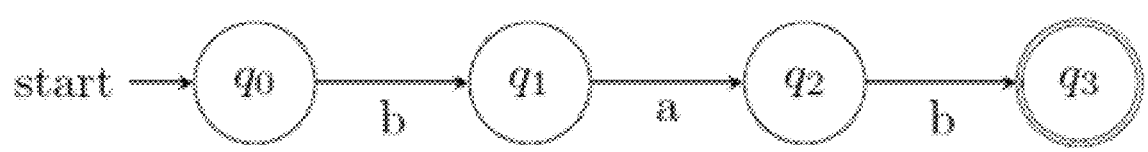
FIG. 22 shows a diagram of a deterministic finite automaton M for single deletion, according to an embodiment.

FIG. 22 shows a diagram 2200 of a deterministic finite automaton M for single deletion, according to an embodiment. As a second example, considering instead $L(M_3) = \{\epsilon\}$ (i.e. case 3) will yield M: {bab} shown in FIG. 22.

A number of other JavaScript functions may be modeled using DFA operations.

Substring

JavaScript substring operations such as substr, slice and substring provide roughly the same functionality and can easily be written in terms of calls to substr. In this section, the modeling of substr operation is described, such that $M = \text{substr}(M_1, n, m)$, where $M_1$ is the input DFA, n is the index of the substring to be extracted and m is the desired length of the output.

In order to implement this operation, perform the following steps:

1) Create $M'_1$ by removing the first n characters from $M_1$
2) Create M by selecting m characters from $M'_1$.

Step 1: Create $M'_1$

To create $M'_1$, first define $M_l = \#_1 Q_l, q_{l0}, \Sigma, \delta_l, F_l \#_2$ which accepts all strings of length n, such that:

$$Q_l = \{q_0, q_1, \ldots, q_n\}$$
$$\forall q_i \in Q_l \backslash q_n, \forall \alpha \in \Sigma, \delta_l(q_i, \alpha) = q_{i+1}$$

$\forall q \in Q_l \backslash q_n$, $F(q)=-$
$F(q_n)=+$

Figure 23:
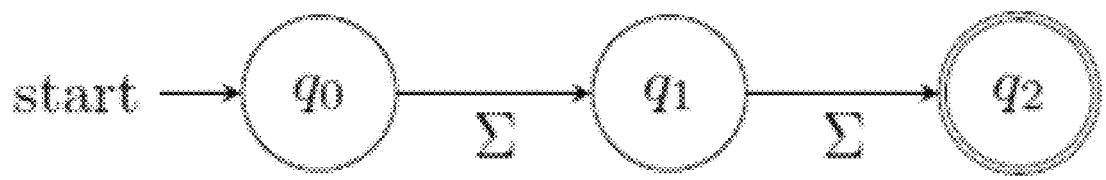
FIG. 23 shows a diagram of a deterministic finite automaton $M_l$ with l equal to 2, according to an embodiment.

FIG. 23 shows a diagram 2300 of a deterministic finite automaton $M_l$ with l equal to 2, according to an embodiment. An example of $M_l$ with l=2 is shown in FIG. 23. To remove the first m characters of $M_1$, perform the replace once operation so that M'1=replace_once(M, $M_l$, $M_{epsilon}$), where $M_\varepsilon$ is the DFA accepting only the empty string, such that $L(M_\varepsilon)=\{\varepsilon\}$.

Figure 24:
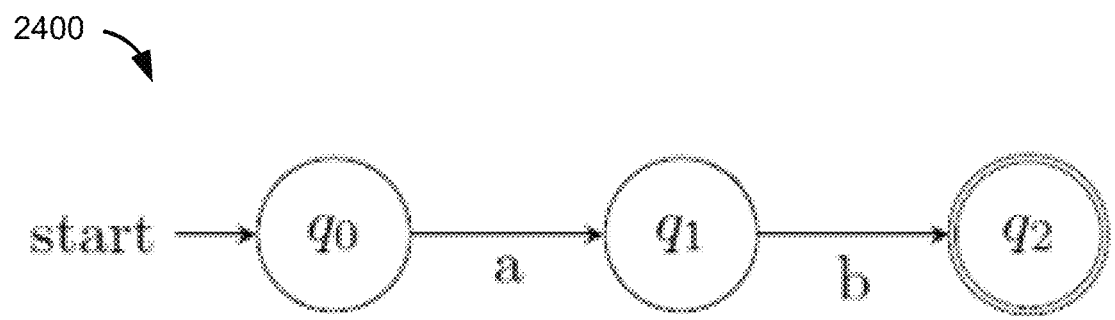
FIG. 24 shows a diagram of a deterministic finite automaton $M'_1$, according to an embodiment.

FIG. 24 shows a diagram 2400 of a deterministic finite automaton $M'_1$, according to an embodiment. An example $M'_1$ after deleting n=2 characters, using $M_1$: baab is shown in FIG. 24.

Step 2: Create M

Figure 25:
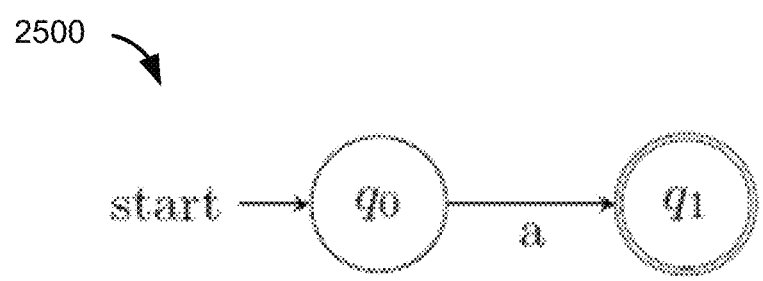
FIG. 25 shows a diagram of a deterministic finite automaton M for a "substr" string operation, according to an embodiment.

FIG. 25 shows a diagram 2500 of a deterministic finite automaton M for a substr string operation, according to an embodiment. To create M, first define $M''_1 = \mathcal{A}_1 Q'_1, q'_{10}, \Sigma, \delta'_1, F''_1 \mathcal{A}_2$, as a copy of $M'_1$, but with all states set to accepting state, i.e.

$\forall q \in Q'_1, F''_1(q)=+$

Then compute the intersection of $M''_1$ with a second version of $M_l$, which accepts strings of length m.

$M = M''_l \cap M_{l=m}$

Setting m=1 in the example yields the DFA shown in FIG. 25.

URL Encoding

Another class of functions which are commonly used by client-side JavaScript to sanitize user input are the URL encoding functions encodeURI, encodeURIComponent and escape. These functions encode certain characters by replacing each one with an encoded string, in this case percent encoding. For example, the character & is replaced by the string %26.

To model these functions, first replace instances of the % character by %25 using the algorithm described in 4.1. Encoding the percent character first is required to avoid double encoding in the next step. Next iterate over all characters encoded by a certain function (excluding %). For example, encodeURI will encode all characters except A-Z 0-9 -_.!~*'( ). For each character, apply the algorithm from the description of Replace Optimization to replace the character with its encoded string.

FIG. 26 shows a diagram 2600 of hardware of a special purpose computing machine for implementing systems and methods described herein. The following hardware description is merely one example. It is to be understood that a variety of computers topologies may be used to implement the above described techniques. The hardware shown in FIG. 26 may be used to implement the computer systems described herein. For example, the automation system described above may be implemented using hardware of the computer system 2610 and the repository system and registry systems may be implemented using one or more of the servers 2631-2634. In some embodiments, the servers 2631-2634 may be implemented using hardware configured similar to the computer system 2610.

The computer system 2610 includes a bus 2605 or other communication mechanism for communicating information, and one or more processor(s) 2601 coupled with bus 2605 for processing information. The computer system 2610 also includes a memory 2602 coupled to bus 2605 for storing information and instructions to be executed by processor 2601, including information and instructions for performing some of the techniques described above, for example. This memory may also be used for storing programs executed by processor(s) 2601. Possible implementations of this memory may be, but are not limited to, random access memory (RAM), read only memory (ROM), or both. A storage device 2603 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 2603 may include source code, binary code, or software files for performing the techniques above, for example. Storage device and memory are both examples of non-transitory computer readable storage mediums.

The computer system 2610 may be coupled via bus 2605 to a display 2612 for displaying information to a computer user. An input device 2611 such as a keyboard, touchscreen, and/or mouse is coupled to bus 2605 for communicating information and command selections from the user to processor 2601. The combination of these components allows the user to communicate with the system. In some systems, bus 2605 represents multiple specialized buses, for example.

The computer system also includes a network interface 2604 coupled with bus 2605. The network interface 2604 may provide two-way data communication between computer system 2610 and a network 2620. The network interface 2604 may be a wireless or wired connection, for example. The network 2620 may be a local area network or an intranet, for example. The computer system 2610 can send and receive information through the network interface 2604, across the network 2620, to computer systems connected to the Internet 2630. Using the Internet 2630 the computer system 2610 may access data and features that reside on multiple different hardware servers 2631-2634. The servers 2631-2634 may be part of a cloud computing environment in some embodiments.

Additional Embodiments

Additional embodiments of the systems and methods described above and provided below.

One embodiment provides a computer system comprising one or more processors. The computer system further comprises one or more machine-readable medium coupled to the one or more processors and storing computer program code. The computer program code includes sets instructions executable by the one or more processors to obtain data flow information indicating one or more string operations in source code that used an input string or information derived from the input string as a parameter when executing the source code. The one or more string operations include a string sanitizer function. The string sanitizer function includes an input parameter and an output parameter. The computer program code further includes sets instructions executable by the one or more processors to generate a graph representing the input parameter and the output parameter of the string sanitizer function. The computer program code further includes sets instructions executable by the one or more processors to generate, based on the graph, a deterministic finite automata representing string values of the output parameter. The deterministic finite automata accepts possible output string values of the string sanitizer function. The computer program code further includes sets instructions executable by the one or more processors to determine that there is a non-empty intersection between the deterministic finite automata and an exploit automata for a security exploit. The non-empty intersection indicates that the string sanitizer function is vulnerable to a code injection exploit.

In some embodiments of the computer system, the string sanitizer function includes a replace-once string operation. The replace-once string operation replaces a first instance of matching string matching a target string but not later instances of the matching string.

In some embodiments of the computer system, the deterministic finite automata sets an accept status or a reject status such that it marks the first occurrence of matching strings in the input string.

In some embodiments of the computer system, the computer program code further comprises sets instructions executable by the one or more processors to execute the source code using a taint tracking mechanism to obtain the obtain data flow information.

In some embodiments of the computer system, the source code is executed using a web browser.

In some embodiments of the computer system, the string sanitizer function includes a substr string operation that returns a first portion of the input string, a slice string operation that returns a second portion of the input string from a start index to a stop index, or a substring string operation that returns a third portion of the input string from a first index to a second index.

In some embodiments of the computer system, the source code is in JavaScript format.

Another embodiment provides one or more non-transitory computer-readable medium storing computer program code. The computer program code includes sets of instructions to obtain data flow information indicating one or more string operations in source code that used an input string or information derived from the input string as a parameter when executing the source code. The one or more string operations includes a string sanitizer function. The string sanitizer function includes an input parameter and an output parameter. The computer program code further includes sets of instructions to generate a graph representing the input parameter and the output parameter of the string sanitizer function. The computer program code further includes sets of instructions to generate, based on the graph, a deterministic finite automata representing string values of the output parameter. The deterministic finite automata accepts possible output string values of the string sanitizer function. The computer program code further includes sets of instructions to determine that there is a non-empty intersection between the deterministic finite automata and an exploit automata for a security exploit. The non-empty intersection indicates that the string sanitizer function is vulnerable to a code injection exploit.

In some embodiments of the non-transitory computer-readable medium, the string sanitizer function includes a replace-once string operation, the replace-once string operation replacing a first instance of matching string matching a target string but not later instances of the matching string.

In some embodiments of the non-transitory computer-readable medium, the deterministic finite automata sets an accept status or a reject status such that it marks the first occurrence of matching strings in the input string.

In some embodiments of the non-transitory computer-readable medium, the computer program code further comprises sets instructions to execute the source code using a taint tracking mechanism to obtain the obtain data flow information.

In some embodiments of the non-transitory computer-readable medium, the source code is executed using a web browser.

In some embodiments of the non-transitory computer-readable medium, the string sanitizer function includes a substr string operation that returns a first portion of the input string, a slice string operation that returns a second portion of the input string from a start index to a stop index, or a substring string operation that returns a third portion of the input string from a first index to a second index.

In some embodiments of the non-transitory computer-readable medium, the source code is in JavaScript format.

Another embodiment provides a computer-implemented method. The method includes obtaining data flow information indicating one or more string operations in source code that used an input string or information derived from the input string as a parameter when executing the source code. The one or more string operations includes a string sanitizer function, the string sanitizer function including an input parameter and an output parameter. The method further includes generating a graph representing the input parameter and the output parameter of the string sanitizer function. The method further includes generating, based on the graph, a deterministic finite automata representing string values of the output parameter. The deterministic finite automata accepts possible output string values of the string sanitizer function. The method further includes determining that there is a non-empty intersection between the deterministic finite automata and an exploit automata for a security exploit. The non-empty intersection indicating that the string sanitizer function is vulnerable to a code injection exploit.

In some embodiments of the computer-implemented method, the string sanitizer function includes a replace-once string operation. The replace-once string operation replaces a first instance of matching string matching a target string but not later instances of the matching string.

In some embodiments of the computer-implemented method, the deterministic finite automata sets an accept status or a reject status such that it marks the first occurrence of matching strings in the input string.

In some embodiments of the computer-implemented method, the deterministic finite automata sets an accept status or a reject status such that it marks the first occurrence of matching strings in the input string.

In some embodiments of the computer-implemented method, the method further comprises executing the source code using a taint tracking mechanism to obtain the obtain data flow information.

In some embodiments of the computer-implemented method, the source code is in JavaScript format.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations, and equivalents may be employed without departing from the scope of the present disclosure as defined by the claims.

What is claimed is:

1. A computer system, comprising:
one or more processors;
one or more machine-readable medium coupled to the one or more processors and storing computer program code comprising sets instructions executable by the one or more processors to:
obtain data flow information indicating one or more string operations in source code that used an input string or information derived from the input string as a parameter when executing the source code, the one or more string operations including a string sanitizer function, the string sanitizer function including an input parameter and an output parameter;
generate a graph representing the input parameter and the output parameter of the string sanitizer function;
generate, based on the graph, a deterministic finite automata representing string values of the output parameter, the deterministic finite automata accepting possible output string values of the string sanitizer function;
determine that there is a non-empty intersection between the deterministic finite automata and an exploit automata for a security exploit, the non-empty intersection indicating that the string sanitizer function is vulnerable to a code injection exploit,
wherein the string sanitizer function includes at least one of: a replace-once string operation, the replace-once string operation replacing a first instance of matching string matching a target string but not later instances of the matching string, a first substring string operation that returns a first portion of the input string, a slice string operation that returns a second portion of the input string from a start index to a stop index, or a second substring string operation that returns a third portion of the input string from a first index to a second index.

2. The computer storage system of claim 1, wherein the deterministic finite automata sets an accept status or a reject status such that it marks the first occurrence of matching strings in the input string.

3. The computer storage system of claim 1, wherein the computer program code further comprises sets instructions executable by the one or more processors to:
execute the source code using a taint tracking mechanism to obtain the obtain data flow information.

4. The computer storage system of claim 3, wherein the source code is executed using a web browser.

5. The computer storage system of claim 1, wherein the source code is in JavaScript format.

6. One or more non-transitory computer-readable medium storing computer program code comprising sets of instructions to:
obtain data flow information indicating one or more string operations in source code that used an input string or information derived from the input string as a parameter when executing the source code, the one or more string operations including a string sanitizer function, the string sanitizer function including an input parameter and an output parameter;
generate a graph representing the input parameter and the output parameter of the string sanitizer function;
generate, based on the graph, a deterministic finite automata representing string values of the output parameter, the deterministic finite automata accepting possible output string values of the string sanitizer function;
determine that there is a non-empty intersection between the deterministic finite automata and an exploit automata for a security exploit, the non-empty intersection indicating that the string sanitizer function is vulnerable to a code injection exploit,
wherein the string sanitizer function includes at least one of: a replace-once string operation, the replace-once string operation replacing a first instance of matching string matching a target string but not later instances of the matching string, a first substring string operation that returns a first portion of the input string, a slice string operation that returns a second portion of the input string from a start index to a stop index, or a second substring string operation that returns a third portion of the input string from a first index to a second index.

7. The non-transitory computer-readable medium of claim 6, wherein the deterministic finite automata sets an accept status or a reject status such that it marks the first occurrence of matching strings in the input string.

8. The non-transitory computer-readable medium of claim 6, wherein the computer program code further comprises sets instructions to:
execute the source code using a taint tracking mechanism to obtain the obtain data flow information.

9. The non-transitory computer-readable medium of claim 8, wherein the source code is executed using a web browser.

10. The non-transitory computer-readable medium of claim 6, wherein the source code is in JavaScript format.

11. A computer-implemented method, comprising:
obtaining data flow information indicating one or more string operations in source code that used an input string or information derived from the input string as a parameter when executing the source code, the one or more string operations including a string sanitizer function, the string sanitizer function including an input parameter and an output parameter;
generating a graph representing the input parameter and the output parameter of the string sanitizer function;
generating a deterministic finite automata for the string sanitizer function based on the graph, the deterministic finite automata accepting possible output string values of the string sanitizer function;
determining that there is a non-empty intersection between the deterministic finite automata and an exploit automata for a security exploit, the non-empty intersection indicating that the string sanitizer function is vulnerable to a code injection exploit,
wherein the deterministic finite automata sets an accept status or a reject status such that it marks the first occurrence of matching strings in the input string.

12. The computer-implemented method of claim 11, wherein the string sanitizer function includes a replace-once string operation, the replace-once string operation replacing a first instance of matching string matching a target string but not later instances of the matching string.

13. The computer-implemented method of claim 11, further comprising:
executing the source code using a taint tracking mechanism to obtain the obtain data flow information.

14. The computer-implemented method of claim 11, wherein the source code is in JavaScript format.

* * * * *